United States Patent [19]

Bernier

[11] Patent Number: 5,065,156

[45] Date of Patent: Nov. 12, 1991

[54] COMPUTER CONTROLLED PARKING METER

[76] Inventor: Denis Bernier, 28 de l'Epée, suite 102, Outremont, Quebec, Canada, H2V 3S9

[21] Appl. No.: 557,762

[22] Filed: Jul. 26, 1990

[51] Int. Cl.[5] .............. B60Q 1/48

[52] U.S. Cl. .............. 340/932.2; 340/309.15; 340/309.2; 40/435; 40/474

[58] Field of Search .............. 340/932.2, 309.15, 309.2; 364/467; 377/90; 235/33; 368/90, 97, 111; 40/430, 435, 473, 474

[56] References Cited

U.S. PATENT DOCUMENTS

| | | | |
|---|---|---|---|
| 4,379,334 | 4/1983 | Feagins, Jr. et al. | 368/90 |
| 4,800,502 | 1/1989 | Steward et al. | 364/467 |
| 4,876,540 | 10/1989 | Berthon et al. | 340/932.2 |

FOREIGN PATENT DOCUMENTS

| | | | |
|---|---|---|---|
| 3146686 | 6/1983 | Fed. Rep. of Germany | 368/90 |
| 0096799 | 4/1989 | Japan | 340/932.2 |

*Primary Examiner*—Donnie L. Crosland

*Assistant Examiner*—Dov Popovici

*Attorney, Agent, or Firm*—ROBIC

[57] ABSTRACT

A computer-controlled coin parking meter for managing the use of a parking lot having up to about ten parking spaces. It includes a first display device which singularly identifies the parking places and push button switches for operating it; a second display device indicating the parking time bought for the identified space; a rotary disk having, along its periphery, visible indicia indicating whether or not parking time has been paid for the parking places and a step-motor for rotating the disk so as to provide this latter information. The meter further includes a coin receiving and counting machine capable of allowing operation of the second display device so that it indicates the parking time bought and also capable of allowing rotation of the step motor and therefore of the indicia disk to display the information. Finally, the meter includes a computer assembly programmed to control sequential operation of the two devices and of the step motor from signals received from the push-button switch and from the coin receiving and counting machine, respectively.

13 Claims, 5 Drawing Sheets

COMPUTER CONTROLLED PARKING METER

BACKGROUND OF THE INVENTION

1. FIELD OF THE INVENTION

The present invention relates to a coin-operated computer-controlled parking meter capable of managing one and up to about ten parking places.

2. DESCRIPTION OF THE PRIOR ART

Street parking meters are of course well known which however serve only a limited number of parking places, usually two. Other parking meters exist that can manage large parking lots of fourthy or more parking spaces. When a customer enters into such a parking lot, he inserts money into the meter and receives a parking ticket having printed thereon the time of entry on the parking lot and the length of time bought. Because of the number of spaces being managed by the meter and the necessity of having a printing machine to issue the tickets, such parking meters are quite sophisticated and therefore expansive to buy as well as high in maintenance costs.

SUMMARY OF THE INVENTION

It is an object of the present invention to provide a parking meter controlled by computer and capable of managing a parking lot of limited size.

Another object of the invention lies in the provision of a parking meter of less cost and still using the great advantages offered by a computer system in giving the information required by a customer in regard particularly to parking time bought.

Still another object of the invention is to provide a parking meter which is battery-operated and wherein the battery is capable of being recharged by means of a photovoltaic cells suitable to pick up solar energy.

Yet another object resides in a parking meter capable of being fully contained in a casing which need not be any longer than the height of a standard single or double place parking meter nor have a large cross section.

More specifically, the parking meter of the invention generally comprises a first display device which singularly identifies the parking places and push button switches for operating it; a second display device indicating the parking time bought for the identified space; a rotary disk having, along its periphery, visible indicia indicating whether or not parking time has been paid for the parking spaces and a step motor for rotating the disk so as to provide this latter information. The meter further comprises a coin receiving and counting machine capable of allowing operation of the second display device so that it indicates the parking time bought and also capable of allowing rotation of the step motor and therefore of the indicia disk to display the said information. Finally, the meter comprises a computer assembly programmed to control sequential operation of the two devices and of the step motor from signals received from the push button switch and from the coin receiving and counting maching, respectively.

Advantageously, the meter is designed for handling up to about ten parking spaces.

In a preferred embodiment, the meter comprises a photovoltaic cell suitable to pick-up solar energy for the operation of the display devices and of the said step motor. The meter further includes one or more batteries that are opposively connected to the voltaic cell, on one end, and to the display devices, the step motor and to the computer, on the other end.

For compactness, the meter is made to have an elongated casing of constant rectangular cross section and divided into a top, a middle and a bottom tamper-proof compartment. The top compartment contains the display devices, the push-button switches, the rotary disk and the step motor, the coin receiving and counting means and the computer means. The middle compartment is separated from the top compartment by a partition wall having a coin slot through it and it contains a removable coin collecting box also having a coin slot which registers with the wall coin slot. The coin receiving and counting machine is constructed to discharge coins into the collecting box through these slots. Finally, the batteries are contained in the bottom compartment.

A description now follows of a preferred embodiment of the invention having reference to the appended drawings.

DESCRIPTION OF THE PREFERRED EMBODIMENT

Figure 1:
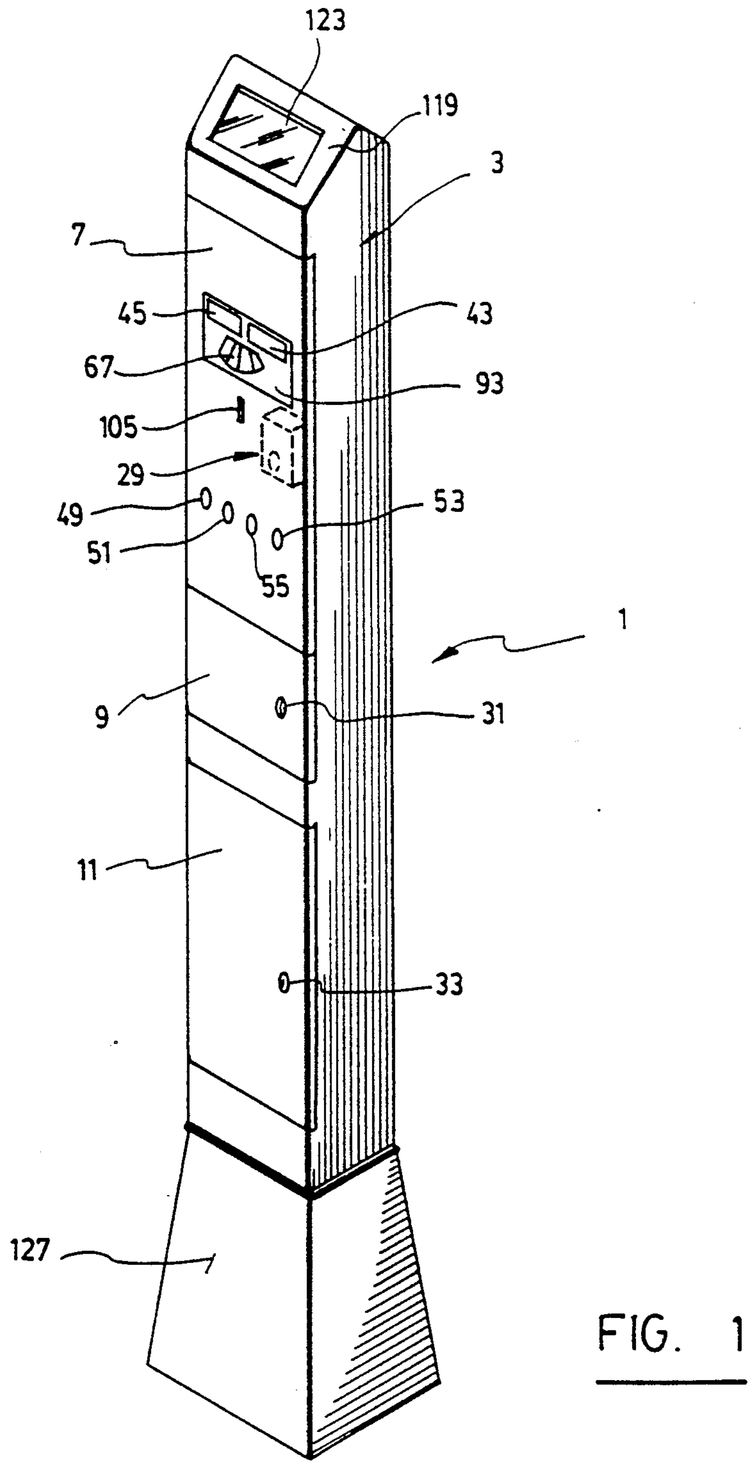
FIG. 1 is a perspective view of a computer-controlled parking meter made according to the invention.

The illustrated computer-controlled parking meter 1 has an elongated hallow casing 3, of constant rectangular cross section, which is rather slender and need not be larger, in cross section, than the head of an ordinary parking meter for one or two cars, nor longer. As shown in FIG. 4, the casing 3 is made up of a channel-shaped section 5 and of three doors 7, 9, 11; each of which being hinged to it in any known manner such as by means of a door leaf 13 secured to the door and a casing leaf 15 secured to the casing 3; the two leaves being interconnected by hinge pin 17. These doors give access to a top compartment 19, a middle compartment 21 and a bottom compartment 23, made tamper-proof by partition walls 25, 27, solid with the walls of the channel section 5, as by welding. The doors 7, 9, 11, can be fastened to the casing 3 by means of any convenient locking system shown symbolically here by three cylinder locks 29, 31, 33, each having a bolt mechanism 34 of which the bolt 35 can be made to fit into the socket 37 of a keeper block 39 on the channel section 5. The middle compartment 21 is to contain a coin collecting box 41 (FIG. 3) of which the access should preferably be available to a person different from those looking after maintenance and repair. For that reason, the lock 31 should be operable by a key different from those of the locks 29 and 33.

Figure 2:
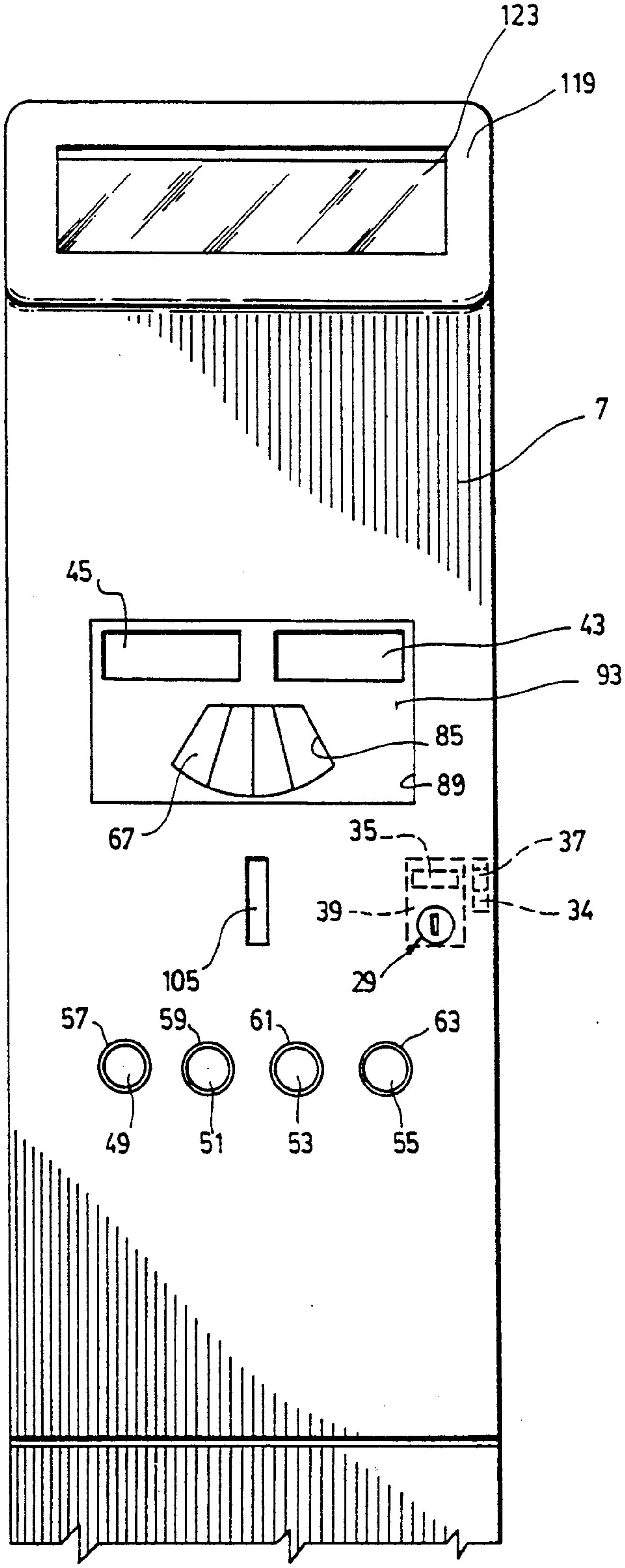
FIG. 2 is a front elevation view, on an enlarged scale, of the top section of the meter of FIG. 1.
Figure 3:
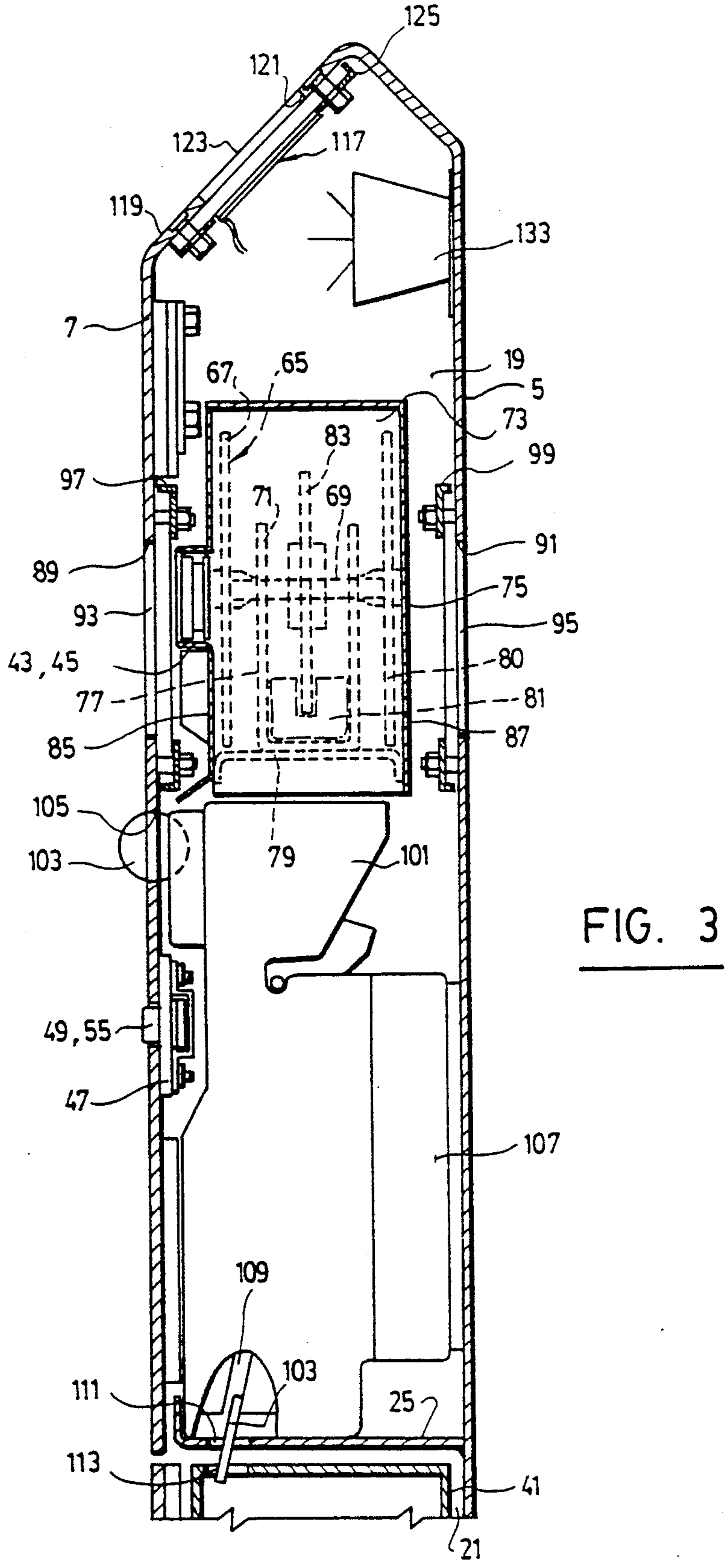
FIG. 3 is a diagrammatic cross section view of the top section of the meter of FIG. 1.
Figure 4:
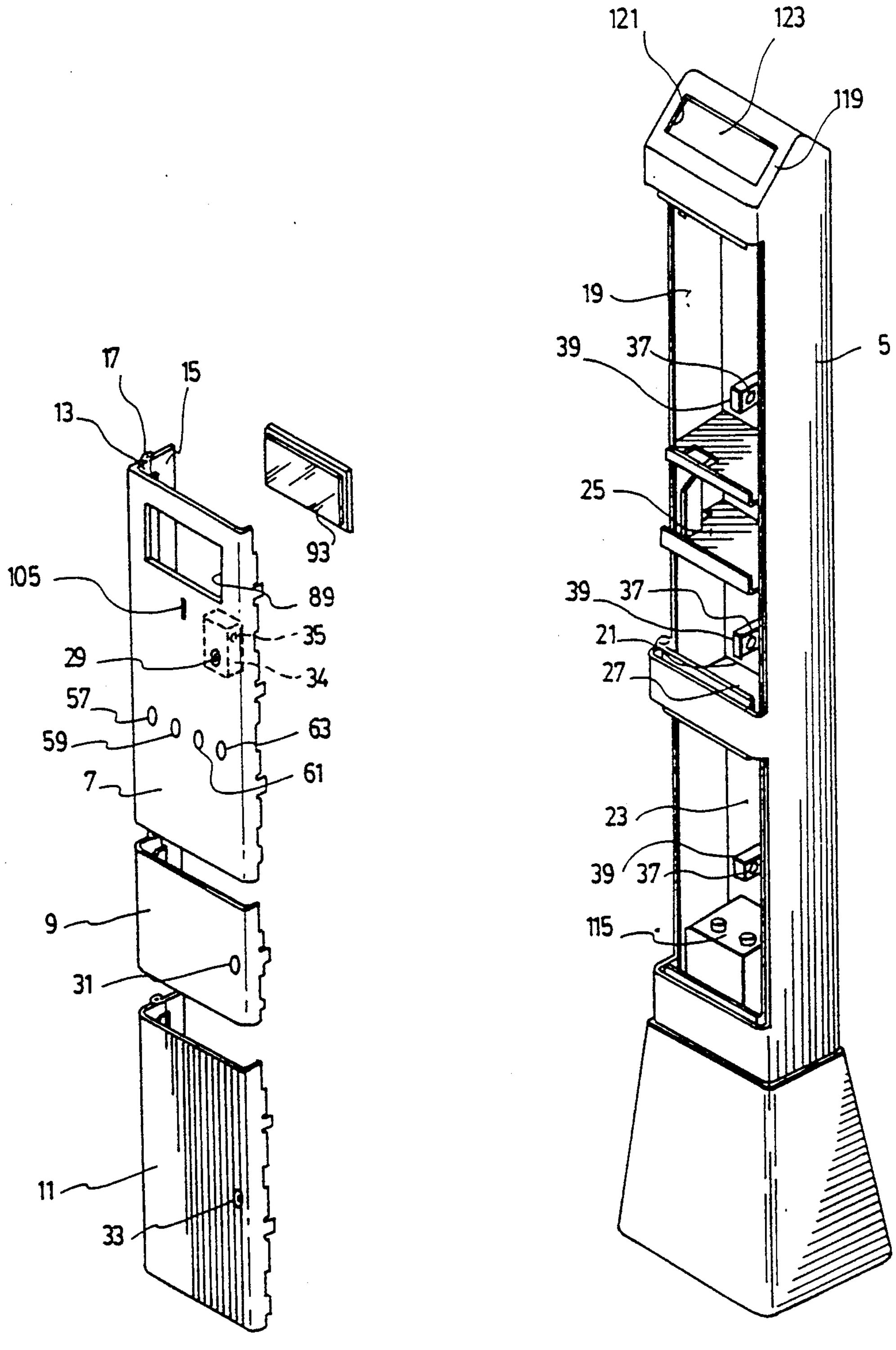
FIG. 4 is a diagrammatic perspective view, exploded, of the meter casing.

Referring particularly to FIGS. 1, 2 and 3, the top compartment 19 contains a first and a second electronic display device 43, 45, of conventional type such as those found in a pocket computer to illustrate the results of various mathematical operations.

In the present case, the meter is for use where four parking spaces are available. It is to be understood, however, that the meter may be designed for a single parking space, as will be gathered from the following description.

The first display 43 serves to indicate which of the four parking spaces is being occupied by displaying on its screen, the same number as that appearing at the selected parking space. Device 43 is operable by four push-button switches, only switch 47 being shown in FIG. 3. The four push-button 49, 51, 53, 55, of these switches are disposed in the same alignment as the parking spaces and project out of the door 7 through wholes 57, 59, 61, 63, (FIG. 4) for selection by the customer.

The second display device 45 serves to display, on its screen, the time that has been bought for the selected parking space which is identified on the screen of the first display device 43. The visual projections remain on the screens of the display devices 43, 45, as long as the relevant push-button is kept pressed by the customer.

Within the top compartment 19 is a mechanism 65 intended to provide information regarding the state of occupancy of the parking spaces. By "state of occupancy" is to be understood the conditions wherein the parking fees for any of the parking spaces have been paid or wherein the paid time has expired so that the relevant spaces are normally free to be occupied again. If, in the latter condition, a car is still in the space, it is obviously so in violation.

Figure 5:
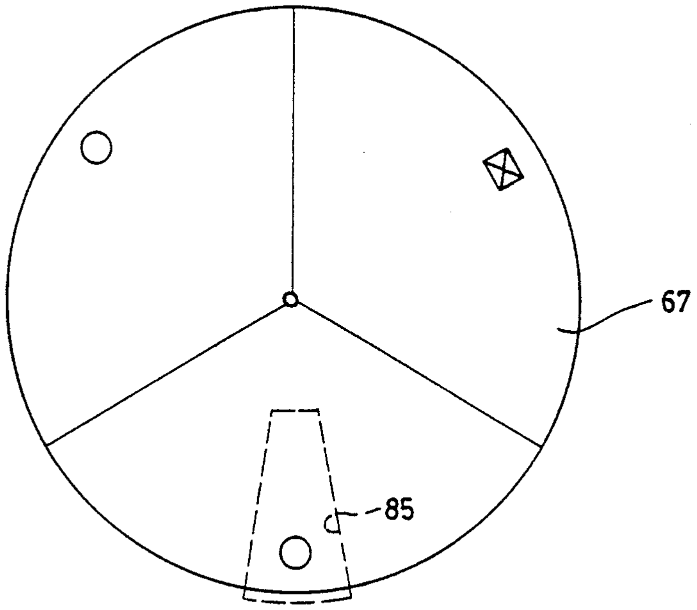
FIG. 5 is a front view of an indicia disk for a single parking space.
Figure 6:
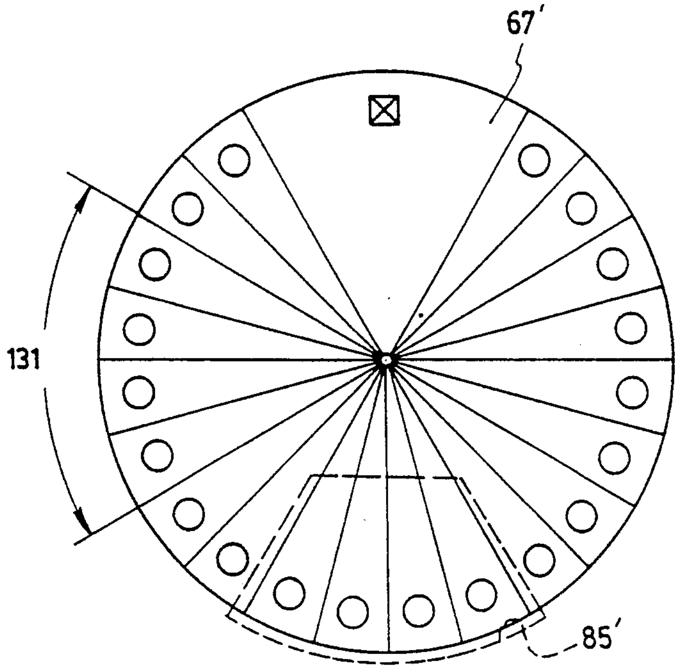
FIG. 6 is a front view of an indicia disk for a multiple parking spaces meter.

Mechanism 65, shown mostly in dotted lines in FIG. 3, comprises a flat rotary disk 67, of the type illustrated in FIGS. 5 or 6, mounted at one end of the axle 69 of a step motor 71 fixed to a semi-cylindrical cover 73 housed within a frame 75. The axle 69 is born by the branches of a U-shaped support 77 fixed to a base plate 79 secured to the sidewalls of the channel section 5. Optionally, a second disk 80 may be provided at the other end of the axle 69.

Within the U-shaped support 77 is an electromagnet 81 for guiding a metallic disk 83 secured to the axle 69 of the step motor 71. The latter is of known type capable of generating output speeds in both directions of rotation and in direct proportion to the dc voltage applied at the input. It has a low armature inertia so that the mechanical response in shifting from one direction of rotation to the other is extremely fast and exceptionally smooth. A motor of this type is manufactured by PMI Motors, KOLLMORGEN CORPORATION of SYOSSET, N.Y. and is particularly well suited for application in the parking meter of the invention as will be seen herein after.

It will be noted from FIG. 2 and 3 that the two display devices 43, 45, are fixed to the frame 75, side by side. The frame 75 also has a pair of generally trunkated sector-shaped cut-outs 85, 87, serving as viewing windows for viewing the information provided at the bottom of the disks 67, 80; the cut-outs being provided below the devices 43, 45.

The door 7 is also cut-out with a rectangular opening 89 capable of giving a view of both the devices 43, 45, and of the bottom of the disk 67 through the frame cut-out 85. A similar opening 91 is formed through the bottom of the channel section 5 where the optional disk 80 is present. Both openings 89, 91, are covered by transparent parallel panels 93, 95, made preferably of polycarbonate. They are removably secured by metal frames 97, 99, bolted to the door 7 and to the channel section 5, respectively.

Also mounted within the top compartment 19, beneath the information-providing mechanism 65 is a known coin receiving and counting machine 101, preferably of the Schlumberger type or equivalent. Coins 103 of various denominations are received into the counting machine through a slot 105. Further to the counted, the coins cause (when falling through the machine 101 connected to a properly programmed computer 107 and to appropriate electronic circuits located behind the machine 101) operation of the second display device 45 which, as aforesaid, indicates the parking time paid for and rotation of the step motor 71 which rotates the disk 67 to provide information as to the aforesaid state of occupation of the selected parking space.

During their travel through the counting machine 101, the coins 103 are flipped by 90 degrees and made to drop into the coin collecting box 41 in the vault 21 after moving through a guiding chute 109 and successive slots 111, 113.

The programmed computer controls sequential operation of the first display device 43, which is responsive the electronic signals received from the computer when the selected push-button 49–55 is pressed; and operation of the second display device 45 of the step motor 71, which are responsive to signals received from the computer when the coins pass through the machine 101.

Electrical energy is derived from a battery 115 lodged within the bottom compartment 23. The battery is operatively connected to the display devices 43, 45, to the step motor 71 and to the computer 107. It is further connected to a voltaic cell assembly 117, provided at the top of the meter casing 3 and suitable to pick-up solar energy to recharge the battery. As best shown in FIG. 3, the casing 3 is closed by a structure having an inclined face 119 formed with a rectangular opening 121 receiving a transparent polycarbonate pane 123 removably secured to the casing inclined wall 119 by a frame 125 removably bolted to it. The voltaic cell of the assembly 117 is fixed to the pane 123.

Turning now to FIG. 5, there is shown a disk 67 intended when the meter 1 is to be used to control a single parking space. The disk is divided into three zones and the indicia, giving the state of occupancy of the parking space, consist of a light-colored spot indicating that parking time has been paid and a dark-colored spot indicating that no time is paid and that the place should normally be available if, of course, it is not unduly occupied in which case a supervising policeman should issue a contravention or other measure should be taken. The third zone contains a signal of any type to indicate that the meter is out of order. The indicia may alternatively consist of colors a bid over all of the surfaces of the zones, such as white when the parking time is paid, black when it is expired and yellow when the meter is out of order.

Assuming that no parking time is paid for, the dark spot stands in the display cut-out 85 of the door 7. After a customer has moved his car into the parking space, he starts inserting money into the slot 105 and presses on the single push-button appearing on the meter. The push-button sends a signal to the computer 107 which, in turn, orders the step motor 71 to rotate the indicia disk clockwise whereby to move the light spot into the cut-out 85, as in FIG. 5. The computer simultaneously responds to a signal received from the coin receiving and counting machine 101 and orders actuation of the display device 45 which then shows how much time has been bought. After the time as expired, the computer automatically orders counter-clockwise rotation of the disk to move the dark spot back into the viewing cut-out 85 to notify that the parking space is available. Whenever it is desired to know how much time is left, the push-button is pressed and the remaining time appears in the viewing screen of the display device 45. If additional time is required, more coins are inserted into the slot 105. Should the meter break down, the computer automatically shifts the out-of-order signal into the viewing cut-out 85.

In the disk 67' of FIG. 6, the viewing cut-out 85' is sized to allow the showing of four spots each corresponding to a particular one of the four parking spaces. The spots appearing in the cut-out 85' and the press-buttons 49–55 are disposed in the same order as are the parking places and correspondingly identified.

Let us now assume that the situation, or state of occupancy, is that shown in the cut-out 85' drawn in dotted lines in FIG. 6 with the first three spaces being available and the fourth one being occupied, and that a car moves into the place identified by the second dark spot. The car driver then goes to the meter and presses on the push-button numbered two and starts inserting money into the slot 105. The computer 107 then orders the display device 43 to show number two to indicate that the place is occupied and orders display device 45 to show for how long. Simultaneously, it commands the step motor 71 to rotate the disk 85' counter-clockwise to shift the sequence 131, in FIG. 6, to move into the viewing cut-out 85' which then shows spaces two and four as duly paid for. The spots on the disk 67' are of course distributed so as to give all possible states of occupancy of the four parking spaces.

Where the parking meter 1 has a cross section which is of the same size as the head of presently existing single or double space parking meters, it has been found that it is possible to use a disk 67 capable of managing up to four spaces.

For convenience in checking the state of occupancy, the back of the meter may be provided with the aforesaid additional disk 80, cut-out 87 through the frame 75 and cut-out 91 through the frame 75 and cut-out 91 through the channel section 5, shown in FIG. 3.

The meter 1 may be bolted or otherwise secured, as its base, to a trunkated pyramide pedestal 127.

To guard against theft or vandalism, a electronic loud speaker system 133 may be provided at the top of the casing 3, being connected to the door locks 29. 31, 33, to the computer 107 and possibly also to the battery 115.

What is claimed is:

1. A computer-controlled parking meter for managing a use of parking spaces, said meter comprising:

a first display device for singularly identifying said parking spaces;

push-button means for operating said first display device;

a second display device for indicating a parking time paid for said identified parking spaces;

a rotary disk having, along a periphery thereof, visible indicia providing information as to a state of paid occupancy of said parking spaces, and step motor means for step rotating said rotary disk to provide said information;

coin receiving and counting means capable of allowing operation of said second display device whereby said second display device indicates a amount of parking time paid, said coin receiving and counting means being also capable of allowing rotation of said step motor means and of said rotary disk whereby said rotary disk displays said information as to said state of paid occupancy of said parking spaces; and computer means for controlling sequential operation of said first and second display devices and of said step motor means from signals received from said push-button means and from said coin receiving and counting means, respectively.

2. A computer-controlled parking meter as claimed in claim 1, further comprising photovoltaic cell means suitable to pick-up solar energy for a operation of said first and second display devices and of said step motor means.

3. A computer-controlled parking meter as claimed in claim 2, further comprising battery means operatively connected to said photovoltaic cell means, to said first and second display devices. to said step motor means and to said computer means.

4. A computer-controlled parking meter as claimed in claim 1, wherein:

said push-button means comprise push-buttons corresponding in number to the number of parking spaces, and wherein said rotary disk indicia provides information regarding each of said parking spaces.

5. A computer-controlled parking meter as claimed in claim 3, wherein:

said push-button means comprise push-buttons corresponding in number to the number of parking spaces, and wherein said rotary disk indicia provides information regarding each of said parking spaces.

6. A computer-controlled parking meter as claimed in claim 5, further comprising an elongated casing of constant cross section divided into top, middle and bottom tamper-proof compartments, and wherein:

said top compartment contains said first and second display devices, said push-button means, said rotary disk and step motor means, said coin receiving and counting means, and said computer means;

said middle compartment is separated from said top compartment by a partition wall having a coin slot therethrough and contains a removable coin collecting box having a coin slot registering with said wall coin box having a coin slot registering with said wall coin slot, said coin receiving and counting means being constructed to discharge coins into said collection box through said slots; and said bottom compartment contains said battery means.

7. A computer-controlled parking meter as claimed in claim 6, wherein:

said casing is rectangular in cross section, being formed of a channel-shaped section and of doors hinged thereto to close said compartments;

locks fasten each of said doors to said channel-shaped section; at least the door closing said middle compartment having a lock operable by a key different from those of the locks of the top and bottom compartment.

8. A computer-controlled parking meter as claimed in claim 7, wherein said casing is closed, at the top, by a structure having an inclined open face and said photovoltaic cell means is mounted on said open.face.

9. A computer-controlled parking meter as claimed in claim 8, wherein said step motor means and said rotary disk are contained in a housing having a display opening for viewing said information-providing rotary disk indicia, said display opening having a shape suitable to allow viewing of a relevant portion of said rotary disk indicia at the periphery of said rotary disk.

10. A computer-controlled parking meter as claimed in claim 9, wherein said door of said top compartment is formed with a viewing window facing said first and second display devices and said display opening through said housing.

11. A computer-controlled parking meter for managing parking spaces, said meter comprising:

a display window for indicating a parking time paid for said parking spaces:

a rotary disk having, along a periphery thereof, visible indicia providing information as to a state of paid occupancy of said parking spaces, and step motor means for step rotating said rotary disk to provide said information;

coin receiving and counting means capable of allowing rotation of said step motor means and of said rotary disk indicia whereby said rotary disk displays said information as to said state of paid occupancy of said parking spaces; and computer means for controlling sequential operation of said step motor means from signals received from said coin receiving and counting means, respectively.

12. A computer-controlled parking meter as claimed in claim 11, further comprising photovoltaic cell means suitable to pick-up solar energy for a operation of said stepmotor means.

13. A computer-controlled parking meter as claimed in claim 12, further comprising battery means operatively connected to said photovoltaic cell means, to said step motor means and to said computer means.

* * * * *